United States Patent [19]

La Grouw et al.

[11] 4,089,693
[45] May 16, 1978

[54] GLASS FOR TELEVISION DISPLAY CATHODE-RAY TUBES

[75] Inventors: Coenraad Maria La Grouw; Plaeger Marius, both of Eindhoven, Netherlands

[73] Assignee: U.S. Philips Corporation, New York, N.Y.

[21] Appl. No.: 476,787

[22] Filed: Jun. 6, 1974

Related U.S. Application Data

[63] Continuation of Ser. No. 75,783, Sep. 25, 1970, abandoned.

[30] Foreign Application Priority Data

Oct. 3, 1969 Netherlands ............... 6915059

[51] Int. Cl.$^2$ ............................................. C03C 3/04
[52] U.S. Cl. ................................. 106/52; 313/480
[58] Field of Search ............... 106/52, 53; 313/480

[56] References Cited

U.S. PATENT DOCUMENTS

| | | | |
|---|---|---|---|
| 2,719,932 | 10/1955 | Stavanth | 106/52 |
| 3,222,206 | 12/1965 | Cornelissen et al. | 106/52 |
| 3,464,932 | 9/1969 | Connelly et al. | 106/53 |

FOREIGN PATENT DOCUMENTS

| | | | |
|---|---|---|---|
| 764,575 | 12/1956 | United Kingdom | 106/53 |
| 1,123,857 | 7/1967 | United Kingdom | 106/53 |

*Primary Examiner*—Winston A. Douglas
*Assistant Examiner*—Mark Bell
*Attorney, Agent, or Firm*—Frank R. Trifari; Daniel R. McGlynn

[57] ABSTRACT

Glass for the envelope of television display cathode-ray tubes, particularly for the face plate of a colour display tube and having a composition in % by weight within the range limited as follows:

| | |
|---|---|
| $SiO_2$ | 54–69 |
| $Na_2O$ | 6–10 |
| $K_2O$ | 5–10 |
| $CaO$ | 0–4 |
| $MgO$ | 0–2.5 |
| $Al_2O_3$ | 0–6 |
| $ZrO_2$ | 0–6 |
| $BaO$ | 8–18 |
| $ZnO$ | 0–5 |
| $CeO_2$ | 0.05–0.3 |
| $Sb_2O_3$ | 0–3 |
| $As_2O_3$ | 0–0.3 |

$[Na_2O] + [K_2O]$ combined 14–20

$[Al_2O_3] + [ZrO_2] < 6$ $2[ZrO_2] + [BaO] + [ZnO] + 4[Sb_2O_3] > 20$ $[ZrO_2] + [ZnO] + [Sb_2O_3] > 3$ $[Sb_2O_3] + [As_2O_3] \geq 0.3$

2 Claims, No Drawings

GLASS FOR TELEVISION DISPLAY CATHODE-RAY TUBES

This is a continuation of application Ser. No. 75,783, filed Sept. 25, 1970, now abandoned.

The invention relates to glass for an envelope of a television display cathode-ray tube, particularly glass for the face plate of the tube.

Special requirements are imposed on glass for envelopes of cathode-ray tubes for the display of coloured television images as compared with that for the display of monochrome television images.

Such a special glass is known from United Kingdom Patent Specification No. 1,123,857 the composition of which in % by weight lies within the following range of compositions:

| | | | |
|---|---|---|---|
| $SiO_2$ | 62–66 | MgO | 0–3 |
| $Li_2O$ | 0–1 | pbO | 0–2 |
| $Na_2O$ | 7–8.5 | $Al_2O_3$ | 1–4 |
| $K_2O$ | 6.5–9 | $As_2O_3 + Sb_2O_3$ | 0.3–0.7 |
| CaO | 2–4.5 | $CeO_2$ | 0.05–0.3 |
| BaO | 11–14 | | |

The special requirements, which as compared with glass for the envelopes for monochrome display, are imposed on glass for envelopes for colour display are connected with differences in the manufacture and the use of these tubes. In the first place the glass components of envelopes for colour display, unlike those of the envelopes for monochrome display, cannot be sealed by fusing them together, but must be connected together with the aid of an enamel. This resides in the fact that a shadow mask is provided in these tubes which mask determines the path of the required three electron beams. Furthermore an extremely fine grating-like pattern of three different luminescent substances corresponding to the apertures of the shadow mask is provided on the inter side of the screen. The requirements relative to the maximum permissible distortion of the glass are in this case much more stringent in connection therewith than for glass of envelopes for monochrome display. In addition the temperature at which the tube must be heated during evacuation must be approximately 20° higher and the heat treatment must be of a longer duration than for the tube for monochrome display.

The glasses within the above-mentioned range are eminently satisfactory in a technological respect relative to the softening point, the quality and the thermal coefficient of expansion. For the acceleration voltages until recently used on the electron guns the absorption of these glasses for the X-ray radiation generated during operation as a result of the electron bombardment on the glass and on the shadow mask is sufficiently great. This even applies when the tube is built in in a cabinet in direct vision construction, thus without a protective cover glass.

The requirement up till now has been that the intensity of transmitted X-ray radiation may be not more than 0.5 millirontgen per hour (mr/h) measured at a distance of 5 cms from the screen at a maximum thickness of 11 mms of the screen glass, an acceleration voltage of 27.5 kV and an anode current of $3 \times 100$ $\mu A$ in a television display tube.

There is, however, a tendency to still further increase the safety margin relative to X-ray radiation transmitted by television display tubes. A kind of glass is currently needed in which not more than 0.5 mr/h is transmitted at an acceleration voltage of up to 35 kV and even 40 kV. The above-described glasses then no longer have a sufficiently high absorption and do not satisfy the stricter safety requirements. For reasons of a technological nature the thickness of the screen cannot be increased much further than 11 mms. To attain a sufficiently high absorption while using a glass within the above-mentioned range of compositions the screen should be thicker by as much as 2.5 mms.

For a satisfactory processing of the glass and moulding face plates thereof it is necessary that the temperature dependence of the viscosity is not too great. In practice this means that the temperature difference between the softening point, which is the temperature at which the viscosity of the glass is $10^{7.6}$ poises, and the annealing point, which is the temperature at which the vicsocity of the glass is $10^{13.4}$ poises, must be at least 190° C.

In connection with the conventional manufacturing technique and the very stringent requirements imposed on the maximum permissible distortion of the glass components during manufacture of the tube, it is necessary that a glass for a colour display tube has an annealing point which is not lower than 485° C.

Finally it is important that a glass for a colour television display tube has approximately the same coefficient of expansion as that of the known glasses (approximately $100 \times 10^{-7}$ between 30° and 300° C), so that a better compatability is obtained with the existing glasses and metal components which must be sealed on or sealed in, respectively.

An object of the invention was to obtain glasses for envelopes of television display tubes, particularly colour television display tubes which satisfy all mentioned requirements including the requirement of a maximum transmitted X-ray radiation of 0.5 mr/h of a display tube equipped with such an envelope and having a screen of approximately 11 mms thick, an acceleration voltage of up to 35 kV and even 40 kV at an anode current of 300 $\mu A$.

U.S. Pat. No. 2,527,693 describes glass for cathode-ray tubes having a coefficient of expansion of between 87 and $93 \times 10^{-7}$ and a softening point below 720° C, a difference between the softening point ($\eta = 10^{7.65}$ poises) and the strain point ($\eta = 10^{14.6}$ poises) of more than 215° C. These glasses have a composition between the following limits in % by weight:

| | |
|---|---|
| $SiO_2$ | 53–75 |
| $Al_2O_3$ | 3–15 |
| $K_2O$ | 0.1–13 } total of alkali oxide |
| $Na_2O$ | 0.1–17 } between 16¼ [BaO] |
| $Li_2O$ | 0.5–2 } and 19¼ [BaO] |
| BaO | 3–28 |
| F | 0.5–2.5 |

There were a few glasses within this range of compositions of which the above-mentioned amount of transmitted X-ray radiation at an acceleration voltage of 35 kV remains below 0.5 mr/h, namely those having a high BaO content of 17% and more. However, this glass is less suitable for a colour display tube because the coefficient of expansion is approximately $10 \times 10^{-7}$ too low. In addition the presence of fluorine, which generally decreases the softening point of glasses, is considered to be less desirable, for it rather strongly attacks the tools used during moulding.

An essential drawback is, however, that these known glasses show impeditive devitrification phenomena so that they are altogether unsuitable for melting in big tanks and automatic manufacture of the moulded parts of envelopes for television display. Glasses having a high BaO content generally have such a tendency of devitrification.

According to the invention a particularly satisfactory compromise was reached by which no difficulty at all due to the tendency of devitrification was experienced.

The glasses according to the invention are characterized in that their compositions lies with the range limited as follows in % by weight:

| | | |
|---|---|---|
| $SiO_2$ | 54 – 69 | |
| $Na_2O$ | 6 – 10 | $[Na_2O] + [K_2O]$ combined 14 – 20 |
| $K_2O$ | 5 – 10 | |
| CaO | 0 – 4 | |
| MgO | 0 – 2.5 | |
| $Al_2O_3$ | 0 – 6 | $[ZrO_2] + [Al_2O_3] < 6$ |
| $ZrO_2$ | 0 – 6 | |
| BaO | 8 – 18 | $[BaO] + 2[ZrO_2] + [ZnO] + 4[Sb_2O_3] > 20$ |
| ZnO | 0 – 5 | $[ZrO_2] + [ZnO] + [Sb_2O_3] > 3$ |
| $CeO_2$ | 0.05 – 0.3 | |
| $Sb_2O_3$ | 0 – 3 | $As_2O_3 + Sb_2O_3 \geq 0.3$ |
| $As_2O_3$ | 0 – 0.3 | |

When the absorption for X-ray radiation is observed as a function of the acceleration voltage, then a decrease in the absorption is found for $ZrO_2$, ZnO, BaO and $Sb_2O_3$ in the voltage trajectory of from 25 to 37.3 kV. At the last-mentioned voltage a discontinuity occurs for BaO: the absorption increases stepwise by a factor of approximately 5 and subsequently decreases, going towards a higher voltage.

This means that if the transmitted X-ray radiation above 37.3 kV to 40 kV is to be maintained below the standard of 0.5 mr/h, the presence of BaO in the glass is particularly effective which is thus obviously to be preferred. The acceleration voltage just below the discontinuity at 37.3 kV is critical for the absorption at a lower voltage. If the transmission just below 37.3 kV is still sufficiently low, then it is also sufficiently low at still lower acceleration voltages. In case of higher voltages the X-ray radiation transmission can be maintained fairly easily below the admitted limit by means of a comparatively small content of BaO.

A preferred range within the above-mentioned range of compositions is the following which comprises glasses of which the transmitted X-ray radiation at least up to 40 kV remains below 0.5 mr/h: (% by weight)

| | | |
|---|---|---|
| $SiO_2$ | 59 – 65 | |
| $Na_2O$ | 6 – 10 | $[Na_2O] + [K_2O]$ combined 14 – 20 |
| $K_2O$ | 5 – 10 | |
| CaO | 0 – 4 | |
| MgO | 0 – 2.5 | |
| $Al_2O_3$ | 0 – 6 | $[ZrO_2] + [Al_2O_3] < 6$ |
| $ZrO_2$ | 0 – 6 | |
| BaO | 8 – 18 | $[BaO] + 2[ZrO_2] + [ZnO] + 4[Sb_2O_3] > 26$ |
| ZnO | 0 – 5 | $[ZrO_2] + [ZnO] + [Sb_2O_3] > 3$ |
| $CeO_2$ | 0.05 – 0.3 | |
| $Sb_2O_3$ | 0 – 3 | $As_2O_3 + Sb_2O_3 \geq 0.3$ |
| $As_2O_3$ | 0 – 0.3 | |

A further preference is give to a range of compositions within the following limits in % by weight:

| | | |
|---|---|---|
| $SiO_2$ | 60 – 63 | |
| $Na_2O$ | 7 – 9 | $[Na_2O] + [K_2O]$ 15 – 18 |
| $K_2O$ | 7 – 10 | |
| CaO + MgO | 1 – 3 | |
| BaO | 11 – 15 | $[BaO] + 2[ZrO_2] > 18$ |
| $ZrO_2$ | 3 – 5 | |
| $Al_2O_3$ | 0 – 3 | $[ZrO_2] + [Al_2O_3] < 6$ |
| $Sb_2O_3$ | 0 – 1 | |
| $As_2O_3$ | 0 – 0.3 | $[Sb_2O_3] + [As_2O_3] \geq 0.3$ |
| $CeO_2$ | 0.05 – 0.3 | |

The invention will now be described with reference to Examples of a number of glasses according to the invention and their important physical values. These glasses were obtained in a manner which is conventional in glass technology by melting a mixture of sand, felspar, sodium carbonate, dolomite, cerium oxide and barium carbonate and optionally potassium carbonate, zinc oxide, magnesium oxide, zirconium silicate, calcium carbonate, sodium nitrate, arsenous oxide and/or antimony trioxide.

The strain point, the annealing point and the softening point and specific gravity are denoted by the abbreviations str.p., ann. p. and sof. p. and s.g., respectively.

The coefficients of expansion of the glasses (exp. coeff.) lie between 98 and 102 × $10^{-7}$ ° C, measured between 30° and 300° C.

| | Composition (wt. %) | | | | | | | | |
|---|---|---|---|---|---|---|---|---|---|
| | 1 | 2 | 3 | 4 | 5 | 6 | 7 | 8 | 9 |
| $SiO_2$ | 61.4 | 55.9 | 60.9 | 63.1 | 61.4 | 61.6 | 63.3 | 59.4 | 60.9 |
| $Na_2O$ | 8.8 | 9.5 | 7.3 | 9.7 | 7.3 | 7.8 | 9.9 | 9.1 | 8.6 |
| $K_2O$ | 7.8 | 5.9 | 8.3 | 8.2 | 8.3 | 8.3 | 7.8 | 6.5 | 7.0 |
| MgO | — | 1.1 | — | 1.1 | — | — | — | 2.0 | — |
| CaO | 2.0 | 1.8 | 2.5 | 1.8 | 1.5 | 1.5 | 3.5 | 1.9 | 2.4 |
| BaO | 13.6 | 15.6 | 15.0 | 9.7 | 15.0 | 15.0 | 9.7 | 11.6 | 11.6 |
| $ZrO_2$ | 3.0 | — | 3.0 | 5.0 | 5.0 | 5.0 | 5.0 | — | — |
| ZnO | — | 4.0 | — | — | — | — | — | 4.0 | 4.0 |
| $Al_2O_3$ | 2.6 | 5.4 | 0.7 | 0.6 | 0.7 | — | — | 3.7 | 3.7 |
| $Sb_2O_3$ | 0.6 | 0.6 | 2.1 | 0.6 | 0.6 | 0.6 | 0.6 | 1.6 | 1.6 |
| $CeO_2$ | 0.2 | 0.2 | 0.2 | 0.2 | 0.2 | 0.2 | 0.2 | 0.2 | 0.2 |
| str.p. (° C) | 474 | 476 | 474 | 468 | 450 | 479 | 477 | 476 | 469 |
| ann.p. (° C) | 501 | 502 | 501 | 476 | 509 | 505 | 504 | 502 | 496 |
| sof.p. (° C) | 694 | 692 | 694 | 702 | 717 | 698 | 703 | 698 | 692 |
| s.g. | 2.75 | 2.82 | 2.79 | 2.71 | 2.79 | 2.79 | 2.71 | 2.75 | 2.75 |

What is claimed is:

1. Glass for envelope of television display cathode-ray tubes, particularly intended for the face plate of the tube consisting essentially of the composition in % by weight

| | | |
|---|---|---|
| $SiO_2$ | 60 – 63 | |
| $Na_2O$ | 7 – 9 | $[Na_2O] + [K_2O]$ 15–18 |
| $K_2O$ | 7 – 10 | |
| $Al_2O_3$ | 0 – 3 | |
| MgO + CaO | 1 – 3 | |
| BaO | 11 – 15 | $[BaO] + 2[ZrO_2] > 18$ |
| $ZrO_2$ | 3 – 5 | $[ZrO_2] + [Al_2O_3] < 6$ |
| $Sb_2O_3$ | 0 – 1 | $[Sb_2O_3] + [As_2O_3]$ combined $\geq 0.3$ |
| $As_2O_3$ | 0 – 0.3 | |
| $CeO_2$ | 0.05 – 0.3 | | wherein the temperature difference between the softening point and the annealing point of said glass is at least 190° C, wherein said glass has an annealing point of at least 485° C, wherein said glass has a coefficient of expansion of approximately 100 × $10^{-7}$ between 30° and 300° C and wherein a screen of said glass approximately 11 mm. thick transmits no more than 0.5 mr/h measured at a distance of 5. cms. from the screen when struck by a stream of electrons developed by an electrode having an acceleration voltage of up to 40K volts at an anode current of approximately 300μa.

2. Glass as claimed in claim 1, consisting essentially of the following composition in % by weight:

| $SiO_2$ | 61.4 | BaO | 13.6 | $CeO_2$ | 0.2 |
|---|---|---|---|---|---|
| $Na_2O$ | 8.8 | $ZrO_2$ | 3.0 | | |
| $K_2O$ | 7.8 | $Al_2O_3$ | 2.6 | | |
| CaO | 2.0 | $Sb_2O_3$ | 0.6 | | |

\* \* \* \* \*

UNITED STATES PATENT OFFICE
CERTIFICATE OF CORRECTION

Patent No. 4,089,693          Dated May 16, 1978

Inventor(s) COENRAAD M. LA GROUW ET AL

It is certified that error appears in the above-identified patent and that said Letters Patent are hereby corrected as shown below:

On the Title Page, Section [75], "Plaeger" should be —Ploeger—

Signed and Sealed this

Twenty-fourth Day of October 1978

[SEAL]

Attest:

RUTH C. MASON
Attesting Officer

DONALD W. BANNER
Commissioner of Patents and Trademarks